(12) United States Patent
Tanaka

(10) Patent No.: US 11,078,864 B2
(45) Date of Patent: Aug. 3, 2021

(54) METHOD OF CONTROLLING FUEL INJECTION AMOUNT OF INTERNAL COMBUSTION ENGINE

(71) Applicant: KABUSHIKI KAISHA TOYOTA JIDOSHOKKI, Kariya (JP)

(72) Inventor: Atsushi Tanaka, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/960,720

(22) PCT Filed: Dec. 7, 2018

(86) PCT No.: PCT/JP2018/045012
§ 371 (c)(1),
(2) Date: Jul. 8, 2020

(87) PCT Pub. No.: WO2019/138746
PCT Pub. Date: Jul. 18, 2019

(65) Prior Publication Data
US 2020/0332740 A1 Oct. 22, 2020

(30) Foreign Application Priority Data
Jan. 11, 2018 (JP) .............................. JP2018-002401

(51) Int. Cl.
*F02D 41/22* (2006.01)
*F02D 41/40* (2006.01)
(Continued)

(52) U.S. Cl.
CPC ............. *F02D 41/40* (2013.01); *F02D 41/22* (2013.01); *F02M 51/061* (2013.01);
(Continued)

(58) Field of Classification Search
CPC .... F02D 41/22; F02D 41/40; F02D 2041/224; F02D 2200/0602; F02D 2200/0606; F02D 2200/0614
See application file for complete search history.

(56) References Cited

U.S. PATENT DOCUMENTS

2005/0155579 A1 7/2005 Isogai
2005/0235964 A1* 10/2005 Shibata ............... F02D 41/3809
123/458
(Continued)

FOREIGN PATENT DOCUMENTS

DE 102008040222 A1 1/2010
DE 102009003176 A1 11/2010
(Continued)

OTHER PUBLICATIONS

Extended European Search Report dated Jan. 11, 2021 from the European Patent Office in EP Application No. 18899725.8.

*Primary Examiner* — Thomas N Moulis
(74) *Attorney, Agent, or Firm* — Sughrue Mion, PLLC

(57) ABSTRACT

A method of controlling a fuel injection amount of an internal combustion engine includes a target injection amount calculation step, a component-by-component wear amount estimation step at which a component-by-component wear amount of an injector component is estimated, the injector component being a plurality of members or a part of the member constituting the injector and selected in advance as the injector component affects an accuracy of the fuel injection amount, a component-by-component correction amount calculation step, a total correction amount calculation step, and a total correction amount reflection step at which the injector injects a corrected target injection amount.

8 Claims, 9 Drawing Sheets

(51) Int. Cl.
*F02M 51/06* (2006.01)
*F02M 61/10* (2006.01)
*F02M 61/18* (2006.01)
*F02M 61/20* (2006.01)
*F02D 41/38* (2006.01)

(52) U.S. Cl.
CPC ............ *F02M 61/10* (2013.01); *F02M 61/18* (2013.01); *F02M 61/20* (2013.01); *F02D 2041/224* (2013.01); *F02D 2041/389* (2013.01); *F02D 2200/0602* (2013.01); *F02D 2200/0606* (2013.01); *F02D 2200/0614* (2013.01)

(56) References Cited

U.S. PATENT DOCUMENTS

| | | | |
|---|---|---|---|
| 2009/0045267 A1* | 2/2009 | Sutter | F02D 41/2438 239/102.2 |
| 2010/0017100 A1* | 1/2010 | Yamamoto | F02D 41/2483 701/104 |
| 2011/0113756 A1* | 5/2011 | Yezerets | F01N 3/106 60/276 |
| 2013/0233936 A1* | 9/2013 | Schwarte | F02M 51/00 239/5 |
| 2016/0333811 A1 | 11/2016 | Klingbeil et al. | |
| 2018/0023501 A1* | 1/2018 | Ottikkutti | F02D 41/2438 123/456 |
| 2018/0087461 A1* | 3/2018 | Fritz | F02D 41/008 |
| 2018/0291856 A1* | 10/2018 | Chandrakar | F02D 41/1462 |
| 2019/0017460 A1* | 1/2019 | Doring | F02D 35/027 |
| 2019/0128204 A1* | 5/2019 | Leblon | F02D 41/3827 |
| 2019/0226420 A1* | 7/2019 | Garimella | F02D 41/021 |
| 2020/0332736 A1* | 10/2020 | Gehrke | G01M 15/102 |

FOREIGN PATENT DOCUMENTS

| | | |
|---|---|---|
| DE | 102016108605 A1 | 11/2016 |
| JP | 2002-250247 A | 9/2002 |
| JP | 2005-201141 A | 7/2005 |
| JP | 2008-297935 A | 12/2008 |
| WO | 2017/218211 A1 | 12/2017 |

* cited by examiner

FIG. 12

[ NEEDLE COMPONENT-BY-COMPONENT CORRECTION AMOUNT MAP ]

FUEL TEMPERATURE = T3 → M1
FUEL TEMPERATURE = T2 → M2
M3

FUEL TEMPERATURE = T1

| FUEL INJECTION AMOUNT \ FUEL PRESSURE | P1 | P2 | P3 | P4 | ·· |
|---|---|---|---|---|---|
| τ1 | D11 | D12 | D13 | D14 | ·· |
| τ2 | D21 | D22 | D23 | D24 | ·· |
| τ3 | D31 | D32 | D33 | D34 | ·· |
| τ4 | D41 | D42 | D43 | D44 | ·· |
| ⋮ | ⋮ | ⋮ | ⋮ | ⋮ | ·· |

METHOD OF CONTROLLING FUEL INJECTION AMOUNT OF INTERNAL COMBUSTION ENGINE

CROSS REFERENCE TO RELATED APPLICATION

This application is a National Stage of International Application No. PCT/JP2018/045,012 filed Dec. 7, 2018, claiming priority based on Japanese Patent Application No. 2018-002,401 filed Jan. 11, 2018, the contents of all of which are incorporated herein by reference in their entirety.

TECHNICAL FIELD

The present invention relates to a method of controlling fuel injection amount of an internal combustion engine such as a diesel engine.

BACKGROUND ART

In recent years, in an internal combustion engine such as a diesel engine, an accurate fuel injection amount is calculated in real time using a computer, and the calculated fuel injection amount is injected from the injector. Although the injector achieves a highly accurate fuel injection amount with respect to the fuel injection amount commanded from the computer, the actual fuel injection amount tends to deviate gradually with respect to the fuel injection amount commanded from the computer due to deterioration over time and the like. From the viewpoint of environmental protection, it is necessary to suppress the deviation of the actual fuel injection amount (actual injection amount from the injector) relative to this command fuel injection amount (command value from the computer) within several percent.

For example, in Patent Document 1, a method of controlling a fuel injection amount of an internal combustion engine, in which a target fuel injection amount command value Qg is calculated from the engine speed and the accelerator depression amount, a correction fuel injection amount Qm with respect to the fuel temperature in the injector is calculated, a command value correction coefficient Cg with respect to the target fuel injection amount command value Qg is calculated, a deterioration correction coefficient Ci with respect to the deterioration of the injector is calculated, a final corrected fuel injection amount $Qmf=Qm*Cg*Ci$ is calculated, and a final fuel injection amount command value $Qf=Qg+Qmf$ is calculated, is disclosed.

CITATION LIST

Patent Document

Patent Document 1: Japanese Patent Application Publication No. 2008-297935

SUMMARY OF INVENTION

Technical Problem

The injector includes a plurality of parts manufactured with high accuracy, and the deteriorations of parts are varied by different factors such as the fuel temperature, the fuel pressure, and the fuel injection amount. For example, the deterioration progresses in an injection hole that is an injection port for fuel formed at the tip of the injector such that the diameter of the fuel injection hole gradually increases as the fuel injection amount and the fuel pressure as a factor, and the deterioration progresses in a return spring that causes the injection to be in an open valve state such that it gradually wears as the number of injections as a factor.

In contrast, in the method of controlling fuel injection amount of the internal combustion engine described in Patent Document 1, the deterioration correction coefficient Ci for deterioration of the injector is calculated from the first correction coefficient Cia based on the fuel temperature in the injector, and a second correction coefficient Cib based on the operation accumulation time of the internal combustion engine. That is, it is assumed that the entire injector is uniformly deteriorated over time disregarding the varied progresses of the deterioration individually in parts constituting the injector. In such case, for example, since the number of injections and the fuel pressure of the injector may be different even in the same operation accumulation time, there is a possibility that a more accurate deterioration correction coefficient Ci cannot be obtained.

The present invention has been made in view of these problems, and it is an objective of the present invention to provide a method of controlling a fuel injection amount of an internal combustion engine that further suppresses a deviation of the actual fuel injection amount from an injector relative to a command fuel injection amount to the injector, by estimating the deterioration affecting the accuracy of the fuel injection amount of the injector more accurately.

Solution to Problem

To solve the above problems, according to the first invention of the present invention is a method for controlling a fuel injection amount of an internal combustion engine using a control device The method includes a target injection amount calculation step at which a target injection amount to be injected from an injector is calculated according to an operating condition of the internal combustion engine, a component-by-component wear amount estimation step at which a component-by-component wear amount of an injector component is estimated, the component-by-component wear amount being a wear amount of the injector component, the injector component being a plurality of members or a part of the member constituting the injector and selected in advance as a component constituting the injector that affects an accuracy of the fuel injection amount from the injector, a component-by-component correction amount calculation step at which a component-by-component correction amount for the injector component is calculated based on the component-by-component wear amount of the injector component, the component-by-component correction amount for the injector component being a correction amount for the injector component, a total correction amount calculation step at which a total correction amount is calculated based on the component-by-component correction amount of the injector component, the total correction amount is a total correction amount for the entire injector, and a total correction amount reflection step at which the injector injects a corrected target injection amount, the corrected target injection amount being the target injection amount corrected by the total correction amount.

Next, the second invention of the present invention is the method of controlling the fuel injection amount of the internal combustion engine according to the above first invention in which the injector component is at least one of a single member, a grouped member consisting of a plurality of associated single members, a part of the single member, or a part of the grouped member.

Next, the third invention of the present invention is the method of controlling the fuel injection amount of the internal combustion engine according to the first invention or the second invention in which the component-by-component wear amount of the injector component is estimated based on at least one of the fuel injection amount from the injector, the number of fuel injections from the injector, a fuel pressure that is a pressure of fuel supplied to the injector, and a fuel temperature that is a temperature of fuel supplied to the injector.

Next, the fourth invention of the present invention is the method of controlling the fuel injection amount of the internal combustion engine according to the third invention in which the component-by-component wear amount of the injector component is estimated by accumulating the component-by-component wear amount of the injector component per injection that is estimated based on at least one of the fuel injection amount from the injector, the number of fuel injections from the injector, a fuel pressure that is a pressure of fuel supplied to the injector, and a fuel temperature that is a temperature of fuel supplied to the injector.

Next, the fifth invention of the present invention is the method of controlling the fuel injection amount of the internal combustion engine according to the fourth invention in which, when the injector is replaced, an accumulated component-by-component wear amount accumulated in connection with the replaced injector is reset.

Next, the sixth invention of the present invention is the method of controlling the fuel injection amount of the internal combustion engine according to any one of the first invention through the fifth invention in which the component-by-component correction amount is calculated based on the component-by-component wear amount for the injector component and a component-by-component correction amount map that is set for the injector component and in which a correction amount corresponding to a predetermined wear amount that is set relative to the fuel injection amount and the fuel pressure.

Next, the seventh invention of the present invention is the method of controlling the fuel injection amount of the internal combustion engine according to any one of the first invention through the sixth invention in which the target injection amount is a target injection time, the component-by-component correction amount is a component-by-component correction time, the total correction amount is a total correction time that is a total of the component-by-component correction time corresponding to the component-by-component correction amount, and the corrected target injection amount is a corrected target injection time, the corrected target injection time being a value obtained by adding the total correction time to the target injection time.

Next, the eighth invention of the present invention is the method of controlling the fuel injection amount of the internal combustion engine according to any one of the first invention through the seventh invention in which the injector includes a nozzle having an injection hole through which fuel is injected, a needle opening and closing the injection hole, a return spring moving the needle to a closing position to close the injection hole, and an electromagnetic coil moving the needle to an opening position to open the injection hole, and the injector component is at least one of the injection hole, the nozzle, the needle, and the return spring.

Advantageous Effects of Invention

According to the first invention, the component-by-component wear amount that is the wear amount of each injector component is estimated on the assumption that the entire injector is not uniformly deteriorated over time and the injector is considered with the injector disassembled (hypothetically disassembled) into a plurality of injector components. In other words, since the deteriorations of the injector components vary, the deterioration is estimated for each injector component. Then, the component-by-component correction amount for each of the injector component, and the total correction amount are calculated. Thus, since the deterioration of the injector (deterioration that affects the accuracy of the fuel injection amount) may be estimated more accurately, the deviation of an actual fuel injection amount from the actual injector relative to the command fuel injection amount to the injector may be suppressed.

According to the second invention, when the injector s considered with the injector disassembled into a plurality of injector components as they affects the accuracy of the fuel injection amount, the injector component is considered to be at least one of a single member, a grouped member consisting of a plurality of single members, a part of the single member, a part of the grouped member. As a result, the injector component whose deterioration changes due to different factors may be appropriately set.

According to the third invention, the component-by-component wear amount of the injector component depending on different factors causing wear for the injector components may be appropriately and accurately estimated.

According to the fourth invention, the component-by-component wear amount of the injector component may be further accurately estimated with an estimation by accumulating the component-by-component wear amount estimated by the third invention.

According to the fifth invention, when the injector is replaced, an estimation of the component-by-component wear amount of the injector component should be newly started, so that the component-by-component wear amount in association with the replaced injector is reset. Since a connector for connecting a tool (such as a vehicle diagnostic computer) for communicating with a control unit (control device) mounted on a vehicle is prepared in a vehicle in recent years, for example, it only needs to issue a command for connecting the tool to the connector and resetting the component-by-component wear amount.

According to the sixth invention, the component-by-component correction amount is appropriately calculated based on the component-by-component wear amount for the injector component.

According to the seventh invention, it is easily accomplished by obtaining the target injection "amount", the component-by-component correction "amount", the total correction "amount", and the corrected target injection "amount" as respective "time", i.e., a physical quantity.

According to the eighth invention, the selection of a plurality of injector components as they affect the accuracy of the fuel injection amount from the injector may be appropriately made.

BRIEF DESCRIPTION OF THE DRAWINGS

FIG. 12 is a table showing an example of a needle component-by-component correction amount map.

DESCRIPTION OF EMBODIMENTS

Figure 1:
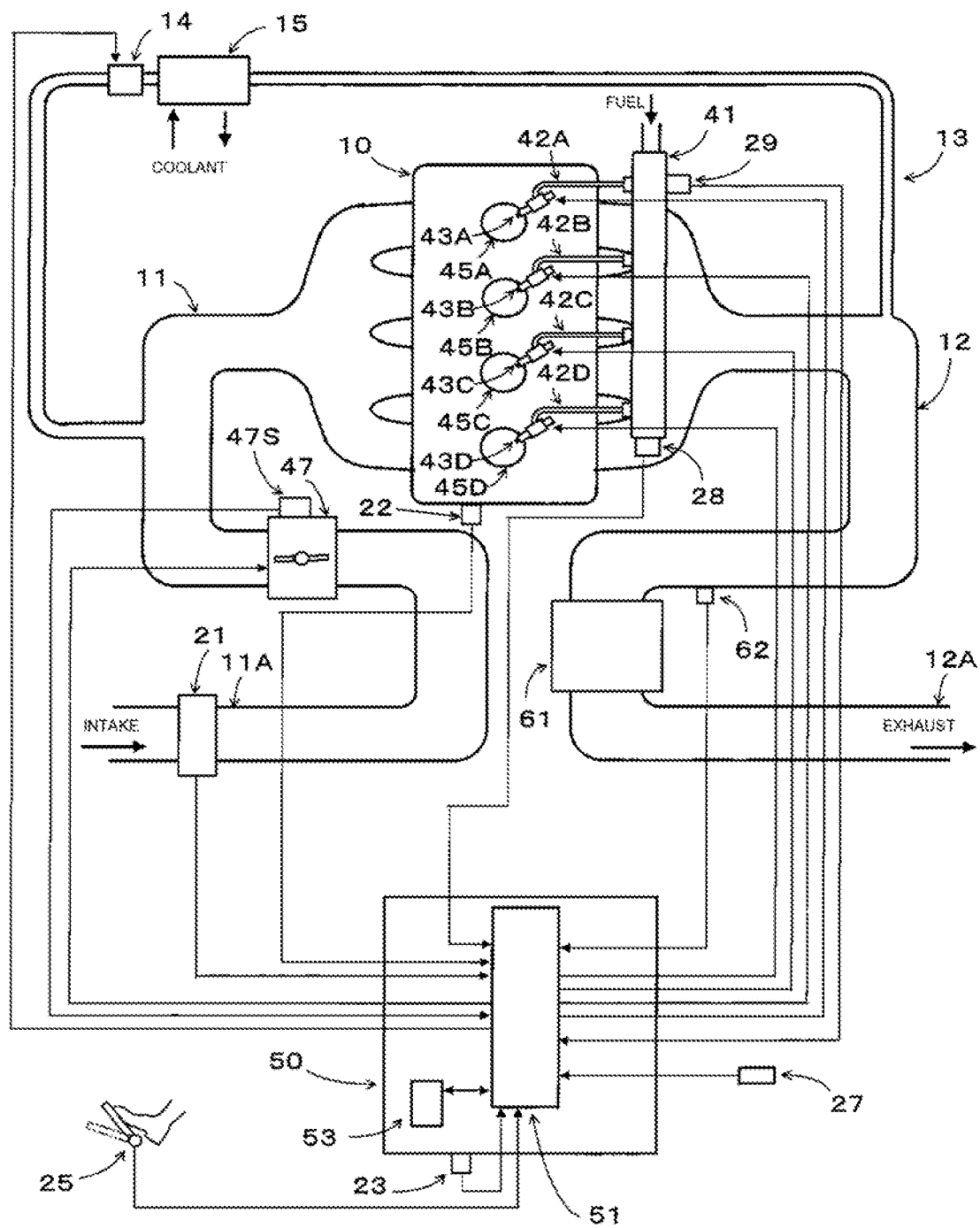
FIG. 1 is a diagram illustrating a schematic configuration of a control system of an internal combustion engine to which a method of controlling a fuel injection amount of an internal combustion engine of the present invention is applied.

[Schematic Configuration of a Control System of an Internal Combustion Engine (FIG. 1) and an Input and Output of a Control Device 50 (FIG. 2)]

Hereinafter, one embodiment for carrying out the present invention will be described with reference to the drawings. Firstly, a schematic configuration of a control system of an internal combustion engine will be described with reference to FIGS. 1 and 2. In the description of the present embodiment, as an example of an internal combustion engine, an engine 10 of the four cylinders (e.g., a diesel engine) mounted on the vehicle will be described. The engine 10 is connected w to an intake pipe 11 through which intake air is introduced to cylinders 45A, 45B, 45C, 45D of the engine 10. Further, the engine 10 is connected to an exhaust pipe 12 to which exhaust gas from each of the cylinders 45A, 45B, 45C, 45D is discharged. The cylinders 45A, 45B, 45C, 45D are provided with injectors 43A, 43B, 43C, 43D, respectively, which are connected to a common rail 41 via fuel pipes 42A, 42B, 42C, 42D. In an intake passage of the intake pipe 11, a flow rate detector 21, an electronic throttle device 47, and the like are provided. In an exhaust passage of the exhaust pipe 12, an exhaust gas temperature detector 62, an exhaust gas purification device 61, and the like are provided. The control device 50 includes at least a controller 51 and a memory 53.

The flow rate detectors 21 is, for example, a flow rate sensor capable of detecting the flow rate of intake air, and is provided in the intake passage 11A. The controller 51 is capable of detecting the flow rate of intake air, which is the flow rate of the intake air drawn into the engine 10, based on a detection signal from a flow rate detector 21.

A rotation detector 22 is, for example, a rotation angular sensor capable of detecting the number of rotations of the internal combustion engine (for example, the number of rotations of a crankshaft) and a rotation angle (for example, a top dead center timing of each cylinder), and the like, and is provided in the engine 10. The controller 51 is capable of detecting the number of rotations, the rotation angle, and the like of the engine 10 based on a detection signal of the rotation detector 22.

An atmospheric pressure detector 23 is, for example, an atmospheric pressure sensor, and is provided in the control device 50. The controller 51 is capable of detecting an atmospheric pressure based on a detection signal from the atmospheric pressure detector 23.

An accelerator pedal depression amount detector 25 is, for example, an accelerator pedal depression angle sensor, and is provided in an accelerator pedal. The controller 51 is capable of detecting the depression amount of the accelerator pedal by the driver based on the detection signal from the accelerator pedal depression amount detector 25.

An electronic throttle device 47 is provided in the intake pipe 11 (intake passage), controls a throttle that adjusts an opening degree of the intake pipe 11 based on a control signal from the controller 51, and is capable of adjusting the flow rate of intake air. The controller 51 is capable of controlling the opening degree of the throttle provided in the intake pipe 11 by outputting a control signal to the electronic throttle device 47 based on a detection signal from the throttle opening detector 47S (e.g., a throttle opening sensor), and a target throttle opening degree.

An EGR passage 13 provides communication between the exhaust pipe 12 and the intake pipe 11, and allows a portion of exhaust gas in the exhaust pipe 12 to flow back to the intake pipe 11.

An EGR valve 14 is disposed in the EGR passage 13 on the exhaust inlet side or the exhaust outlet side thereof at a position adjacent to an EGR cooler 15, and is capable of controlling the opening degree of the EGR passage 13 based on a control signal from the controller 51.

The EGR cooler 15 is provided in the EGR passage 13, and exhaust gas flowing from the exhaust inlet side of the EGR passage 13 that is on the side of the EGR passage 13 adjacent to the exhaust pipe 12 flows into the EGR cooler 15, and is discharged from the EGR cooler 15 to the exhaust outlet side of the EGR passage 13 that is on the side of EGR passage 13 adjacent to the intake pipe 11. Further, the EGR cooler 15 is provided with a coolant for cooling. The EGR cooler 15 is, as it is called, a heat exchanger, and cools exhaust gas flowing thereinto using the coolant and discharge therefrom.

Fuel is supplied to a common rail 41 from a fuel tank (not shown), and is maintained at a high pressure and supplied to each of the injectors 43A, 43B, 43C, 43D via their associated fuel pipes 42A, 42B, 42C, 42D. The injectors 43A, 43B 43C, 43D are provided to correspond to the cylinders 45A, 45B, 45C, 45D, and inject a predetermined amount of fuel into the respective cylinders at a predetermined timing by control signals from the controller 51.

A fuel temperature detector 28 is, for example, a fuel temperature detection sensor, and outputs a detection signal corresponding to the temperature of the fuel in the common rail 41. The controller 51 is capable of detecting the temperature of the fuel in the common rail 41 based on a detection signal from the fuel temperature detector 28.

A fuel pressure detector 29 is, for example, a fuel pressure detection sensor, and outputs a detection signal corresponding to the pressure of the fuel in the common rail 41. The controller 51 is capable of detecting the pressure of the fuel in the common rail 41 based on a detection signal from the fuel pressure detector 29.

A vehicle speed detector 27 is, for example, a vehicle speed detection sensor, and is provided in the wheels of the vehicle, or the like. The controller 51 is capable of detecting the vehicle speed based on a detection signal from the vehicle speed detector 27.

An exhaust gas temperature detector 62 is, for example, an exhaust temperature detection sensor, and outputs a detection signal corresponding to the temperature of the exhaust gas in the exhaust pipe 12. The controller 51 is capable of detecting the temperature of exhaust gas in the exhaust pipe 12 based on the detection signal from the exhaust gas temperature detector 62.

The exhaust gas purification device 61 is, for example, an oxidizing catalyst, a DPF (Diesel Particulate Filter), a selective reduction catalyst, and the like, and removes air pollutants in exhaust gas, Since the oxidation catalyst, the DPF, and the selective reduction catalyst are existing parts, the detailed descriptions thereof will be omitted.

The controller 51 is provided by, for example, a CPU (Central Processing Unit) and is accommodated in the control device 50. As shown in FIG. 2, detection signals from the above various detectors and the like are input to the controller 51, and the controller 51 detects the operating condition of the engine 10 and outputs control signals to operate the injectors 43A, 43B, 43C, 43D, the EGR valve 14, and the electronic throttle device 47. Further, the controller 51 is capable of detecting the amount of fuel supplied to each cylinder 45A, 45B, 45C, 45D by the control signals (injection command signals) that the controller 51 itself outputs to the injectors 43A, 43B, 43C, 43D. The inputs to the controller 51, and the outputs from the controller 51 are not limited to the examples shown in FIGS. 1 and 2, and there are inputs from various detectors (e.g., a cooling water temperature detector, a NOx detector), and outputs to various actuators (e.g., various lamps). It is noted that each of the members accompanied with the reference numerals 51A through 51E in FIG. 2 will be described later.

The memory 53 is a memory device such as a as a Flash-ROM, and stores therein a program for executing a process, which will be described later.

[Structure of Injector and Selection of Injector Components (FIGS. 3 and 4)]

Figure 3:
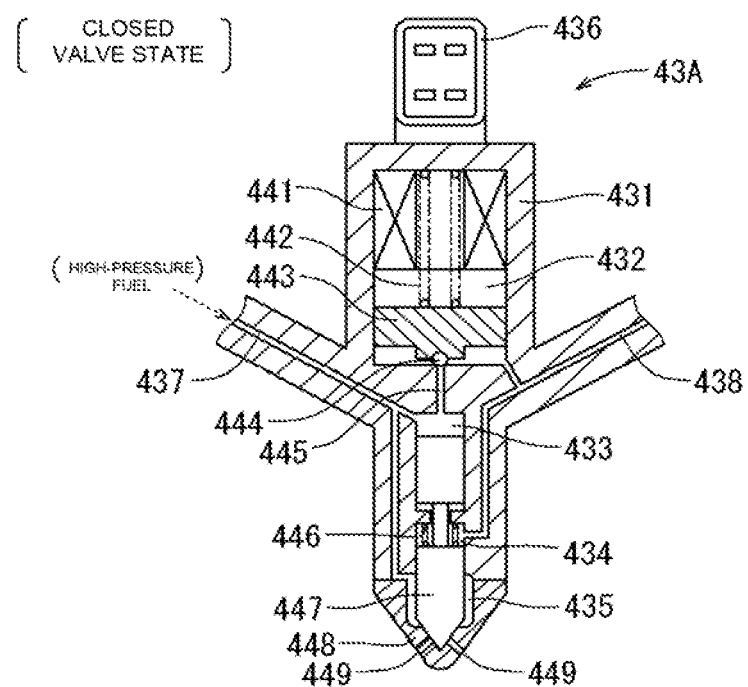
FIG. 3 is a sectional view (schematic view) illustrating the structure and operation of the injector, which is a diagram showing a closed valve state.
Figure 4:
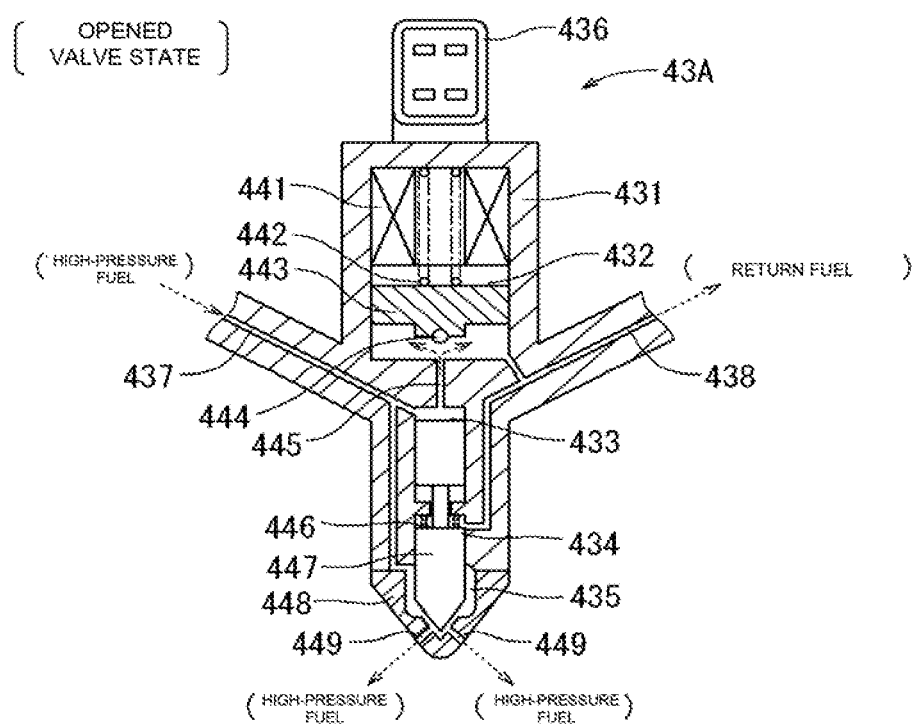
FIG. 4 is a sectional view (schematic view) illustrating the structure and operation of the injector, which is a diagram showing an opened valve state.

FIG. 3 shows a cross-sectional view (schematic view) of the injector 43A when the valve is closed, and FIG. 4 shows a cross-sectional view (schematic view) of the injector 43A when the valve is opened. Since the injectors 43A, 43B, 43C, 43D shown in FIG. 1 have the same structure, the injector 43A will be described as an example. As shown in FIGS. 3 and 4, the injector 43A includes a body 431, a connector 436, an electromagnetic coil 441, a return spring 442, a control valve 443, a ball valve 444, a needle 447, a needle spring 446, a nozzle 448, and the like.

The body 431 has therein hollow portions, namely, a suction chamber 432, a control chamber 433, and a needle chamber 434, and includes a high-pressure fuel supply passage 437, an orifice 445, and a return fuel discharge passage 438.

The electromagnetic coil 441, the return spring 442, the control valve 443, and the ball valve 444 are accommodated in the suction chamber 432. The electromagnetic coil 441 attracts the control valve 443 upward when electric power is supplied through the connector 436. When the supply of electric power to the electromagnetic coil 441 is stopped, the control valve 443 is urged downward by the return spring 442. The ball valve 444 is attached to the lower end of the control valve 443, and when the control valve 443 is positioned at the lower end position, the ball valve 444 closes the upper end of the orifice 445. The suction chamber 432 communicates with the control chamber 433 through the orifice 445, and is connected to the return fuel discharge passage 438.

An upper portion of the needle 447 is accommodated in the control chamber 433. The control chamber 433 is connected to the high-pressure fuel supply passage 437 and is in communication with the suction chamber 432 through the orifice 445. When the upper end of the orifice 445 is closed by the ball valve 444, the control chamber 433 is filled with high-pressure fuel supplied from the high-pressure fuel supply passage 437.

A lower portion of the needle 447 and the needle spring 446 are accommodated in the needle chamber 434. The needle chamber 434 is connected to the return fuel discharge passage 438.

The nozzle 448 is attached to the lower end of the body 431, and has therein a charging chamber 435 which is a hollow portion. The injection hole 449, which is a through hole providing communication between the charging chamber 435 and the outside of the nozzle 448, is formed in the lower part of the nozzle 448. The charging chamber 435 is connected to high-pressure fuel supply passage 437.

When the supply of electric power to the electromagnetic coil 441 is stopped, the injector 43A is in a closed valve state as described below. When the supply of electric power to the electromagnetic coil 441 is stopped, the control valve 443 is urged downward by the return spring 442, and the ball valve 444 closes the upper end of the orifice 445. Thus, high-pressure fuel from the high-pressure fuel supply passage 437 is filled in the control chamber 433. The downward urging force to the upper part of the needle 447 due to high-pressure fuel in the control chamber 433 and the upward urging force to the lower part of the needle 447 due to high-pressure fuel in the charging chamber 435 are substantially in equilibrium, and the needle 447 is urged downward by the needle spring 446. Accordingly, when the supply of electric power to the electromagnetic coil 441 is stopped, the injector 43A is in the closed valve state with the needle 447 urged downward to close the injection hole 449.

As has been described, the injection hole 449 through which fuel is injected is formed in the nozzle 448. The needle 447 opens and closes the injection hole 449. Additionally, the return spring 442 directly moves the control valve 443 downward, which indirectly moves the needle 447 to the closing position to close the injection hole 449. The electromagnetic coil 441 directly moves the control valve 443 upward, which indirectly moves the needle 447 to the opening position to open the injection hole 449.

When electric power is supplied to the electromagnetic coil 441, the injector 43A is in the open valve state as described below. When electric power is supplied to the electromagnetic coil 441, the control valve 443 is attracted upward by the electromagnetic coil 441, and the ball valve 444 is separated from the upper end of the orifice 445. Then, the high-pressure fuel filled in the control chamber 433 flows into the suction chamber 432 through the orifice 445, and the fuel pressure in the control chamber 433 decreases. It is noted that the low-pressure fuel flowing into the suction chamber 432 is discharged through the return fuel discharge passage 438. When the fuel pressure in the control chamber 433 decreases, high-pressure fuel filled in the charging chamber 435 pushes up the needle 447, and the tip of the needle 447 is separated from the injection hole 449, which results in the valve opened state.

The injector 43A repeats the above described valve opening and valve closing, and various wear progresses in various parts of the injector. For example, wear of the return spring 442 progresses at a contact portion between the return spring 442 and the control valve 443, Further, wear of the needle 447 in the tip thereof progresses at a contact portion with the nozzle 448 by contact and flow of high-pressure fuel. In addition, wear progresses in a part of the inner wall of the nozzle 448 surrounding the injection hole 449 at a contact portion where the part of the inner wall of the nozzle 448 is in contact with the tip of the needle 447 by such contact therebetween and the flow of high-pressure fuel, and wear of the inner wall of the injection hole 449 progresses by the flow of high-pressure fuel. Since these wears are not progressed by the same factors, each wear progresses differently depending on the injection state and fuel state. For example, wear of the return spring 442 progresses in accordance with the number of fuel injections, wear of the needle 447 and wear of the nozzle 448 progress according to the fuel injection amount and the fuel pressure of the high-pressure fuel, and the wear of the injection hole 449 progresses in accordance with the fuel injection amount and the fuel pressure of the high-pressure fuel.

Accordingly, the entire injector does not wear uniformly, but different wear progresses in each member and in a part of the member. Therefore, it is preferable to select, in advance, injector components as components that affect an accuracy of the fuel injection amount from the injector, and estimate wear of each injector component. The injector component is a component that is considered to affect the accuracy of the fuel injection amount from the injector, and is at least one of a single member, a grouped member formed by a plurality of associated single members, a part of the single member, a part of the grouped member, which constitutes the injector. In the present embodiment, a case where the needle 447 (a single member), the return spring 442 (a single member), the nozzle 448 (a single member), the injection hole 449 (a part of the single member) shown in FIGS. 3 and 4 are selected as the injector components will be described as an example.

When the injector 43A carries out an opening-and-closing valve operation only once, the wear amount is almost a negligible level. However, as the opening-and-closing valve operation is repeated for several thousands of and tens of thousands of times with the rotation of the internal combustion engine, the wear amount becomes a non-negligible amount, so that the deviation of the actual fuel injection amount from the actual injector relative to the command fuel injection amount from the control device to the injector becomes unacceptable deviation. For this reason, it is necessary to carry out a control to suppress such deviation periodically or constantly.

In recent years, in general vehicles, there are vehicles in which a control that periodically learns the above deviation amount from the amount of torque fluctuation of the internal combustion engine when a predetermined amount of fuel is injected at spot-wise during coasting running (during coasting running in a neutral state) while a supply of fuel is cut before stopping the vehicle. In industrial vehicles, however, it is difficult to utilize this method. A method of controlling the fuel injection amount of the internal combustion engine of the present embodiment described below is particularly effective for industrial vehicles (also effective for general vehicles) and suppresses the above-described deviation constantly.

[Processing by the Controller 51 (FIG. 5)]

The following will describe Steps of the process of the flowchart shown in FIG. 5 will be described. The process of the flowchart shown in FIG. 5 corresponds to the method of controlling the fuel injection amount of the engine 10 (the internal combustion engine) using the control device 50 (see FIGS. 1 and 2), and is started, for example, at each fuel injection timing from the injector. After the control device 50 starts the process shown in FIG. 5, the process proceeds to Step S100 by the control device 50. In the present embodiment, an example in which the needle 447 (a single member), and the return spring 442 (a single member), the nozzle 448 (a single member), the injection hole 449 (a part of a single member) shown in FIGS. 3 and 4 are selected as injector components will be described.

At Step S100, the control device 50 calculates the target injection amount to be injected this time (e.g., target injection time) based on, for example, the current number of rotations of the internal combustion engine and the current accelerator pedal depression amount, and the process proceeds to Step S200. For example, the target injection amount map (not shown) corresponding to the number of rotations of the internal combustion engine and the accelerator pedal depression amount are stored in the memory 53 (see FIG. 1), and the controller 51 (see FIG. 1) calculates, using the number of rotations of the internal combustion engine, the accelerator pedal depression amount, and the target injection amount map. The process of Step S100 corresponds to the target injection amount calculation step at which the target injection amount to be injected from the injector according to the operating condition of the engine (the internal combustion engine) is calculated. Further, as shown in FIG. 2, the controller 51 executing Step S100 functions as a target injection amount calculating unit 51A, which calculates the target injection amount to be injected from the injector according to the operating condition of the engine (the internal combustion engine).

At Step S200, the control device 50 reads a component-by-component wear amount of each injector component corresponding to the injector injecting currently, calculates a component-by-component correction amount that is a correction amount for each injector component corresponding to the injector injecting currently based on each component-by-component wear amount, and the process proceeds to Step S300. The process of Step S200 will be described in detail later. The component-by-component wear amount is stored for each injector and for each injector component. The process of Step S200 corresponds to the component-by-component correction amount calculation step at which the component-by-component correction amount that is a correction amount for each injector component is calculated based on the component-by-component wear amount of each injector component. Further, as shown in FIG. 2, the controller 51 executing Step S200 functions as a component-by-component correction amount calculating unit 51C that calculates the component-by-component correction amount that is a correction amount for each injector component based on the component-by-component wear amount of each injector component.

At Step S300, the control device 50 calculates the total correction amount, which is a total correction amount for the entire injector injecting currently, based on the component-by-component correction amount for each injector component corresponding to the injector injecting currently, and the process proceeds to Step S400. The process of Step S300 will be described in detail later. The process of Step S300 corresponds to the total correction amount calculation step at which the total correction amount, which is the correction amount for the entire injector, based on the component-by-component correction amount for each injector component. Further, as shown in FIG. 2, the controller 51 executing Step S300 functions as a total correction amount calculating unit 51D, which calculates the total correction amount, which is the correction amount for the entire injector, based on the component-by-component correction amount for each injector component.

At Step S400, the control device 50 calculates a corrected target injection amount by adding the target injection amount calculated at Step S100 and the total correction amount calculated at Step S300, and proceeds to Step S500. Since the target injection "amount" is calculated as the target injection "time" and the total correction "amount" is calculated as the total correction "time" in the present embodiment, the corrected target injection "amount" is also calculated as the corrected target injection "time".

At Step S500, the control device 50 operates the injector injecting currently with the corrected target injection amount (corrected target injection time) as the command fuel injection amount, and the process proceeds to Step S600. The injector injecting currently opens the valve according to the corrected fuel injection amount, and injects the amount of fuel corresponding to the corrected fuel injection amount. The processes of Steps S400 and S500 correspond to the total correction amount reflection step at which the corrected target injection amount, which is the target injection amount corrected by the total correction amount, is injected from the injector at the injection timing of the injector. Further, as shown in FIG. 2, the controller 51 executing Steps S400 and S500 functions as a total correction amount reflecting unit 51E that injects the corrected target injection amount, which is the target injection amount corrected by the total correction amount, from the injector at the injection timing of the injector.

At Step S600, the control device 50 estimates the wear amount (current wear amount), which is the component-by-component wear amount of the injector component corresponding to the injector injecting currently, and the process proceeds to Step S700. The detail of Step S600 will be described. The process of Step S600 corresponds to a component-by-component wear amount estimation step at which the component-by-component wear amount of the injector component that is a plurality of members or a part of the member constituting the injector and selected in advance as a component constituting the injector that affects an accuracy of the fuel injection amount from the injector is estimated. Further, as shown in FIG. 2, the controller 51 executing Step S600 functions as a component-by-component wear amount estimating unit 51B that estimates the component-by-component wear amount of each injector component that is a plurality of members or a part of the member constituting the injector and is selected in advance as it affects the accuracy of the fuel injection amount from the injector is estimated.

At Step S700, the control device 50 adds the wear amount of each injector component by the current injection estimated at Step S600 to the component-by-component wear amount of each injector component corresponding to the injector having injected currently and stores such amount, and ends the process. In other words, the control device 50 accumulates each wear amount estimated at Step S600 as the component-by-component wear amount. The process of Step S700 will be described in detail later.

[Details of the Processes of Steps S600 and S700 (Estimation and Accumulation Processes of Component-by-Component Wear Amount) (FIG. 6)]

Next, the processes of Step S600 and Step S700 shown in FIG. 5 will be described in detail with reference to FIG. 6. At Step S600 in FIG. 5, the control device 50 proceeds to Step S610 shown in FIG. 6.

At Step S610, the control device 50 obtains the fuel injection amount that is injected at the current injection at Step S500 (corrected target injection amount), the current (present) fuel pressure, and the current (present) fuel temperature. Further, the control device 50 substitutes the number of fuel injections [i-1]+1 for the number of fuel injections [i] corresponding to the injector injecting this time by (counting up the number of fuel injections corresponding to the injector having injected currently), and proceeds to Step S620.

Figure 8:
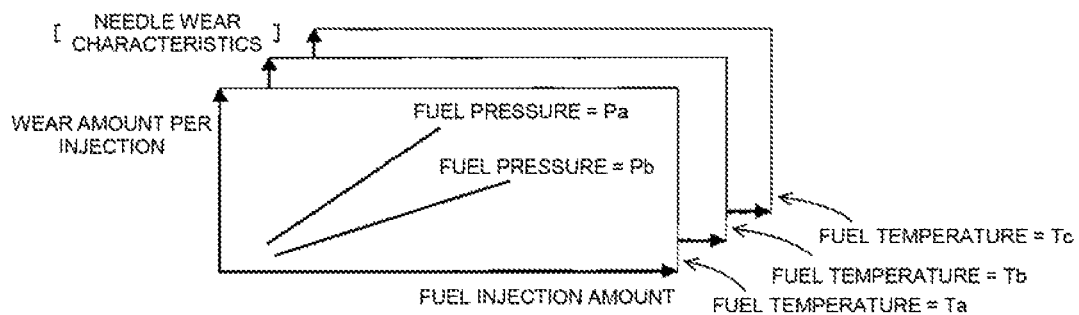
FIG. 8 is a chart showing an example of needle wear characteristics.

At Step S620, the control device 50 estimates the (needle) wear amount of the needle 447 (see FIG. 3), which is one of the injector components corresponding to the injector having injected currently at Step S500, based on the fuel injection amount obtained at Step S610, the fuel pressure, the fuel temperature, and the needle wear characteristics stored in the memory. For example, the needle wear characteristics set for the fuel temperatures shown in FIG. 8 are stored in the memory, and the horizontal axis is set for the fuel injection amount and the vertical axis is set for the wear amount (per injection) of the needle (e.g., as the wear amount in the tip of the needle 447 in contact with the nozzle 448 shown in FIG. 3). For example, the control device 50 selects a needle wear characteristic corresponding to the fuel temperature, and obtains the (needle) wear amount corresponding to the fuel pressure and the fuel injection amount using the selected needle wear characteristic.

Then, the control device 50 stores a new needle component-by-component wear amount [i] that is a wear amount obtained by adding (accumulating) the (needle) wear amount obtained this time to the needle component-by-component wear amount [i-1] that is stored in connection with the injector injected this time in the memory. That is, the control device 50 stores the accumulated needle component-by-component wear amount that is the (needle) wear amount in connection with the injector having injected this time is accumulated by storing the needle component-by-component wear amount obtained by substituting "the (previous) needle component-by-component wear amount+the (current) (needle) wear amount" for "the (current) needle component-by-component wear amount". Then, the control device 50 proceeds to Step S630.

Figure 9:
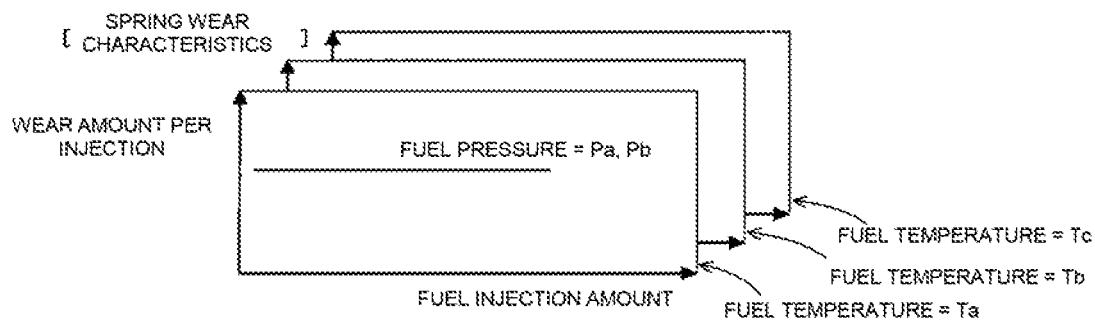
FIG. 9 is a chart showing an example of spring wear characteristics.

At Step S630, the control device 50 estimates the (spring) wear amount of the return spring 442 (FIG. 3), which is one of the injector components corresponding the injector having injected this time at Step S500, based on the fuel injection amount obtained at Step S610, the fuel pressure, the fuel temperature, and the spring wear characteristics stored in the memory. For example, the spring wear characteristics set for the fuel temperatures shown in FIG. 9 are stored in the memory, and the horizontal axis is set for the fuel injection amount and the vertical axis is set for the wear amount (per injection) of the return spring (e.g., the wear amount in the end of the return spring 442 in contact with the control valve 443 shown in FIG. 3). For example, the control device 50 selects a spring wear characteristic corresponding to the fuel temperature, and obtains the (spring) wear amount corresponding to the fuel pressure and the fuel injection amount using the selected spring wear characteristic.

Then, the control device 50 stores a new spring component-by-component wear amount [i] that is an amount obtained by adding (accumulating) the (spring) wear amount obtained this time to the spring component-by-component wear amount [i-1] that is stored in connection with the injector injected this time in the memory. That is, the control device 50 stores the accumulated spring component-by-component wear amount that is the (spring) wear amount in connection with the injector injected this time is accumulated by storing the spring component-by-component wear amount obtained by substituting "the (previous) spring component-by-component wear amount+the (current) (spring)

wear amount" for "the (current) spring component-by-component wear amount". Then, the control device 50 proceeds to Step S640.

Figure 10:
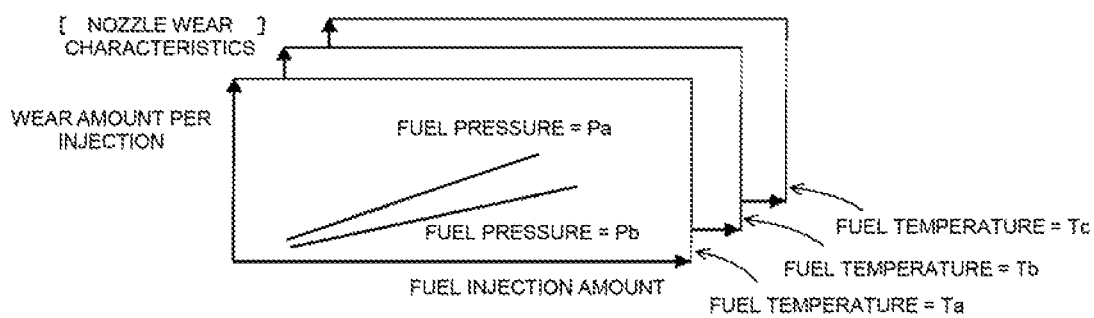
FIG. 10 is a chart showing an example of nozzle wear characteristics.

At Step S640, the control device 50 estimates the (nozzle) wear amount of the nozzle 448 (see FIG. 3), which is one of the injector components corresponding to the injector injected at Step S500, based on the fuel injection amount obtained at Step S610, the fuel pressure, the fuel temperature, and the nozzle wear characteristics stored in the memory. For example, the nozzle wear characteristics set for the fuel temperatures shown in FIG. 10 are stored in the memory, and the horizontal axis is set for the fuel injection amount and the vertical axis is set for the nozzle wear amount (per injection) (e.g., the wear amount in the end of the needle 447 in contact with the nozzle 448 shown in FIG. 3). For example, the control device 50 selects a nozzle wear characteristic corresponding to the fuel temperature, and obtains the (nozzle) wear amount according to the fuel pressure and the fuel injection amount, using the selected nozzle wear characteristic.

Then, the control device 50 stores a new nozzle component-by-component wear amount [i] that is an amount obtained by adding (accumulating) the (nozzle) wear amount obtained this time to the nozzle component-by-component wear amount [i–1] that is stored in connection with the injector injected this time in the memory. That is, the control device 50 stores the accumulated nozzle component-by-component wear amount that is the (nozzle) wear amount in connection with the injector injected this time is accumulated by storing the nozzle component-by-component wear amount obtained by substituting "the (previous) nozzle component-by-component wear amount+the (current) (nozzle) wear amount" for "the (current) nozzle component-by-component wear amount". Then, the control device 50 proceeds to Step S650.

Figure 11:
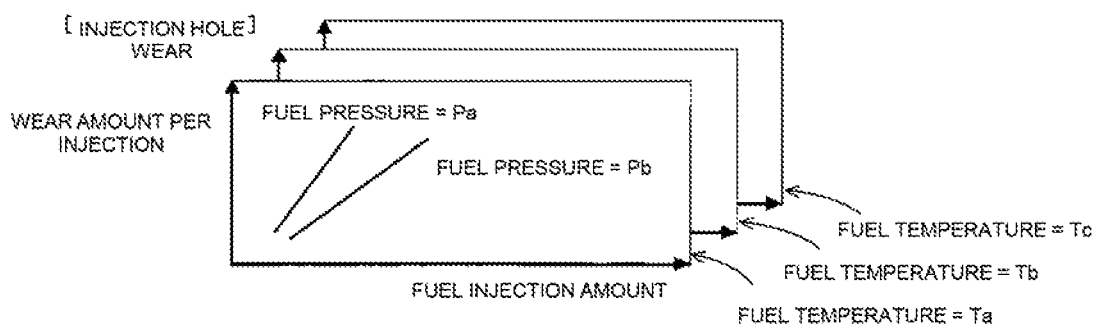
FIG. 11 is a chart showing an example of wear characteristics for the injection hole.

At Step S650, the control device 50 estimates the (injection hole) wear amount of the injection hole 449 (see FIG. 3), which is one of the injector components corresponding to the injector injected this time at Step S500 based on the fuel injection amount obtained at Step S610, the fuel pressure, the fuel temperature, and the injection hole wear characteristics stored in the memory. For example, the injection hole wear characteristics for the fuel temperatures shown in FIG. 11 are stored in the memory, and the horizontal axis is set for the fuel injection amount and the vertical axis is set for the wear amount (per injection) of the injection hole (e.g., the wear amount of the injection hole 449 shown in FIG. 3). For example, the control device 50 selects an injection hole wear characteristic corresponding to the fuel temperature, and obtains the (injection hole) wear amount corresponding to the fuel pressure and the fuel injection amount using the selected injection hole wear characteristic.

Then, the control device 50 stores a new injection hole component-by-component wear amount [i] that is a wear amount obtained by adding (accumulating) the (injection hole) wear amount obtained this time to the injection hole component-by-component wear amount [i–1] that is stored in connection with the injector injected this time in the memory. That is, the control device 50 stores the accumulated injection hole component-by-component wear amount that is the (injection hole) wear amount in connection with the injector injected this time is accumulated by storing the injection hole component-by-component wear amount obtained by substituting "the (previous) injection hole component-by-component wear amount+the (current) (injection w hole) wear amount" for "the (current) injection hole component-by-component wear amount". Then, the process returns to Step S700 of FIG. 5, and is ended by the control device 50.

[Details of the Process of Steps S200, S300 (Calculation of the Component-by-Component Correction Amount and the Total Correction Amount) (FIG. 7)]

Figure 5:
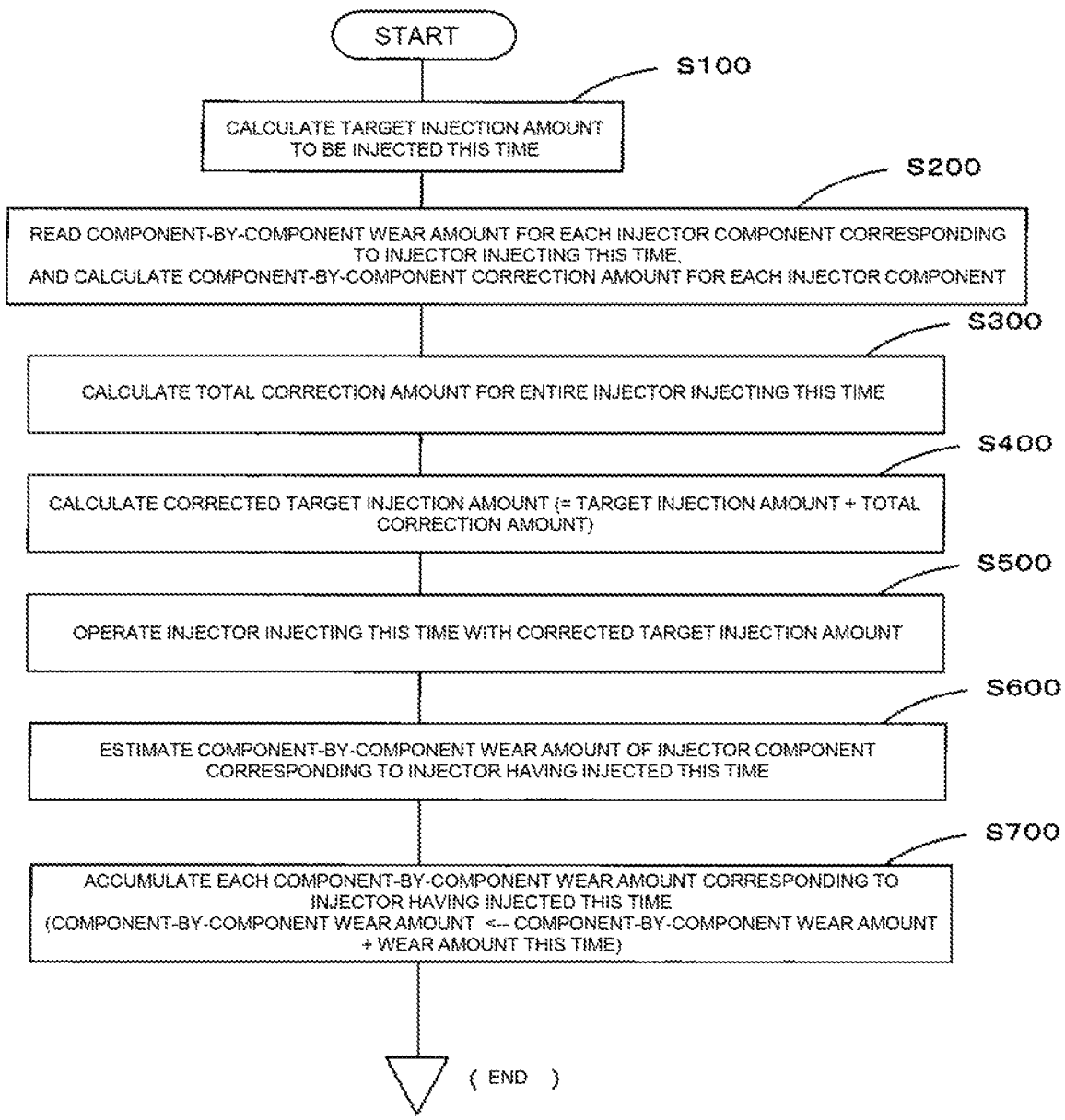
FIG. 5 is a flowchart showing a procedure of an entire process executed by a control device.
Figure 6:
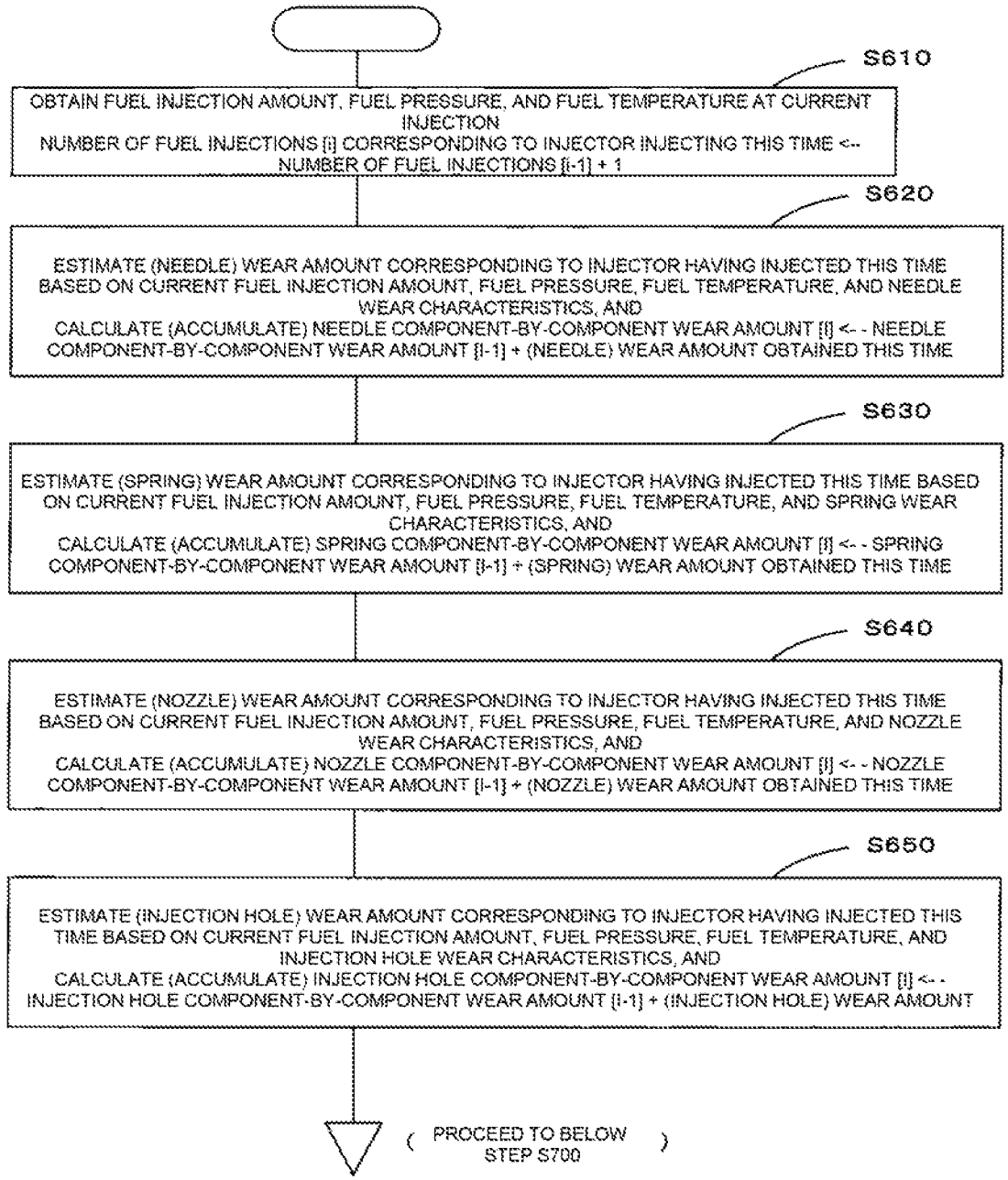
FIG. 6 is a flowchart describing the details of Step S600 and Step S700 shown in the flowchart shown in FIG. 5.
Figure 7:
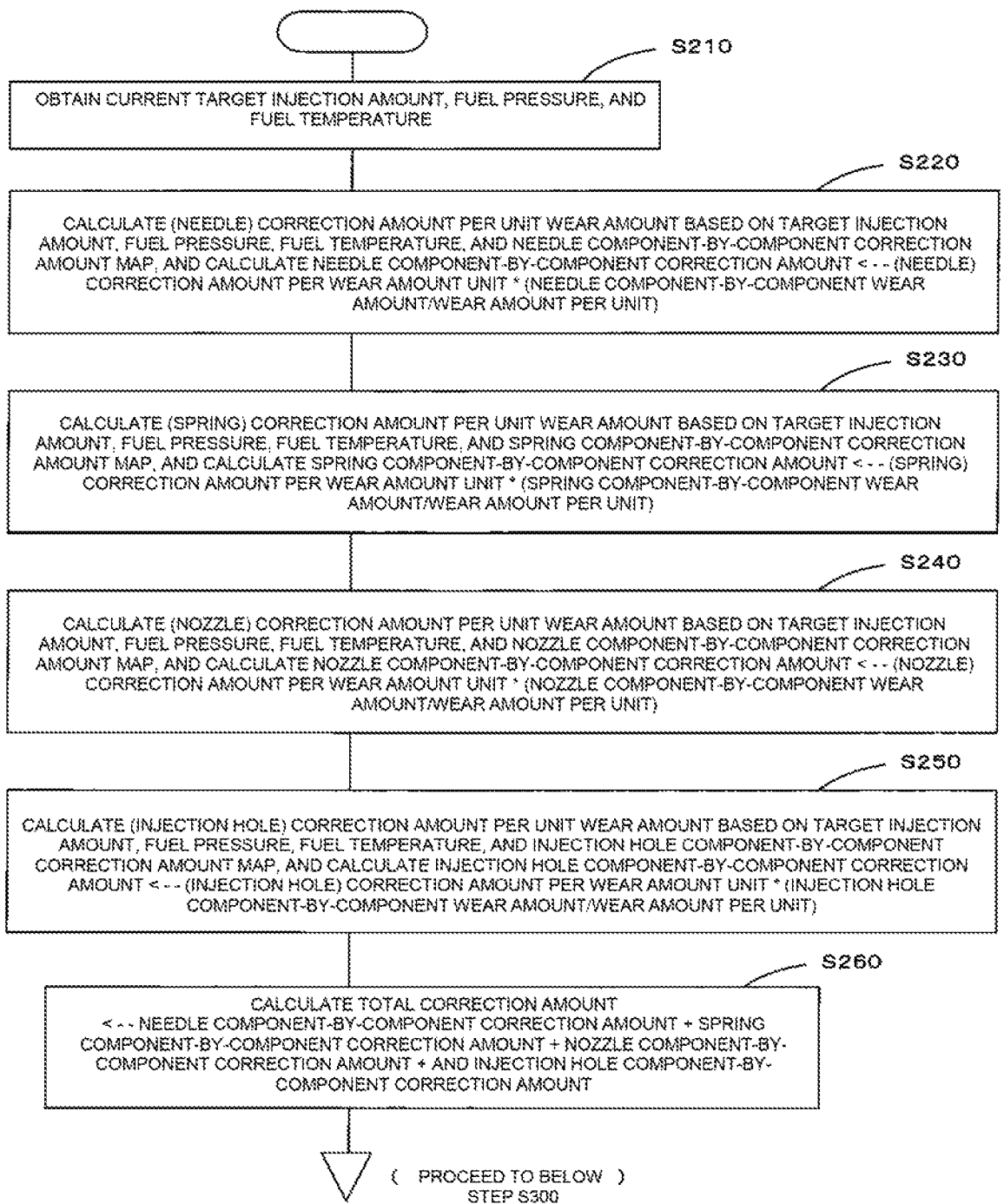
FIG. 7 is a flowchart describing the details of Step S200 and Step S300 shown in the flowchart shown in FIG. 5.

The following will describe Step S200 and Step S300 of the process shown in FIG. 5 in detail with reference to FIG. 7. At Step S200 in FIG. 5, the control device 50 proceeds to Step S210 shown in FIG. 7.

At Step S210, the control device 50 obtains the target injection amount determined at Step S100, the current (present) fuel pressure, and the current (present) fuel temperature, and proceeds to Step S220.

At Step S220, the control device 50 estimates the needle component-by-component correction amount that corresponds to the wear amount of the needle 447 (see FIG. 3), which is one of the injector components of the injector injecting this time, based on the target fuel injection amount obtained at Step S210, the fuel pressure, the fuel temperature, and the needle component-by-component correction amount map stored in the memory, and proceeds to Step S230. For example, the needle component-by-component correction amount maps M1, M2, M3 shown in FIG. 12 for the fuel temperatures are stored in the memory. For example, in the needle component-by-component correction amount maps M1, M2, M3, the fuel pressures (fuel pressure: P1, P2 . . . ) are set in the "row" direction and the injection amounts (target injection amount: τ1, τ2 . . . ) are set in the "column" direction, and the correction amount (D11, D12 . . . ) relative to the fuel pressure and the injection amount are set. It is noted that the correction amount (D11, D12 . . . ) is set as a correction amount per wear amount unit (corresponding to a predetermined wear amount). For example, the control device 50 selects a needle component-by-component correction amount map according to the fuel temperature, and calculates the (needle) correction amount per unit wear amount according to the fuel pressure and the injection amount (target injection amount) using the selected needle component-by-component correction amount map. Then, the control device 50 calculates the needle component-by-component correction amount in association with the injector injecting this time by multiplying the estimated "(needle) correction amount per wear amount unit" by the needle component-by-component wear amount/wear amount per unit".

At Step S230, the control device 50 estimates the spring component-by-component correction amount corresponding to the wear amount of the return spring 442 (see FIG. 3), which is one of the injector components corresponding to the injector injecting this time, based on the target fuel injection amount, the fuel pressure, the fuel temperature, which are obtained at Step S210, and the spring component-by-component correction amount map stored in the memory, and proceeds to Step S240. For example, the spring component-by-component correction amount maps (not shown), similarly to FIG. 12, for the fuel temperatures are stored in the memory. For example, in the spring component-by-component correction amount map, the fuel pressures are set in the "row" direction and the injection amounts (target injection amount) are set in the "column" direction, and the correction amounts corresponding to the fuel pressure and the injection amount are set (similarly to FIG. 12). It is noted that the correction amount is set as a correction amount per wear amount unit. For example, the control device 50 selects a spring component-by-component correction amount map according to the fuel temperature, and calculates the (spring)

correction amount per unit wear amount according to the fuel pressure and the injection amount (target injection amount) using the selected spring component-by-component correction amount map. Then, the control device 50 calculates the spring component-by-component correction amount in connection with the injector injecting this time by multiplying the estimated "(spring) correction amount per wear amount unit" by the spring component-by-component correction amount/wear amount per unit".

At Step S240, the control device 50 estimates the nozzle component-by-component correction amount corresponding to the wear amount of the nozzle 448 (see FIG. 3), which is one of the injector components of the injector injecting this time, based on the target fuel injection amount obtained at Step S210, the fuel pressure, the fuel temperature, and the nozzle component-by-component correction amount map stored in the memory, and proceeds to Step S250. For example, the nozzle component-by-component correction amount maps (not shown), similarly to FIG. 12, for the fuel temperatures are stored in the memory. For example, in the nozzle component-by-component correction amount map, the fuel pressure is set in the "row" direction and the injection amount (target injection amount) is set in the "row" direction, and the correction amount corresponding to the fuel pressure and the injection amount is set (similarly to FIG. 12). It is noted that the correction amount is set as a correction amount per wear amount unit. For example, the control device 50 selects a nozzle component-by-component correction amount map according to the fuel temperature, and calculates the (nozzle) correction amount per unit wear amount according to the fuel pressure and the injection amount (target injection amount) using the selected nozzle component-by-component correction amount map. Then, the control device 50 calculates the nozzle component-by-component correction amount in association with the injector injecting this time by multiplying the estimated "(nozzle) correction amount per wear amount unit" by the nozzle component-by-component wear amount/wear amount per unit".

At Step S250, the control device 50 estimates the injection hole component-by-component correction amount corresponding to the wear amount of the injection hole 449 (see FIG. 3), which is one of the injector components of the injector injecting this time based on the target fuel injection amount obtained at Step S210, the fuel pressure, the fuel temperature, and the injection hole component-by-component correction amount map stored in the memory, and proceeds to Step S260. For example, the injection hole component-by-component correction amount maps (not shown), similarly to FIG. 12, for the fuel temperatures are stored in the memory. For example, in the injection hole component-by-component correction amount map, the fuel pressure is set in the "row" direction and the injection amount (target injection amount) is set in the "row" direction, and the correction amount corresponding to the fuel pressure and the injection amount is set (similarly to FIG. 12). It is noted that the correction amount is set as a correction amount per wear amount unit.

For example, the control device 50 selects a injection hole component-by-component correction amount map according to the fuel temperature, and calculates the (injection hole) correction amount per wear amount unit according to the fuel pressure and the injection amount (target injection amount) using the selected injection hole component-by-component correction amount map. Then, the control device 50 calculates the injection hole component-by-component correction amount in association with the injector injecting this time by multiplying the estimated "(injection hole) correction amount per wear amount unit" by the injection hole component-by-component correction amount/wear amount per unit".

At Step S260, the control device 50 calculates the total correction amount by adding the needle component-by-component correction amount, the spring component-by-component correction amount, the nozzle component-by-component correction amount, and the injection hole component-by-component correction amount, and proceeds to Step S400 in FIG. 5. In the present embodiment, the component-by-component correction "amount" is calculated as the component-by-component correction "time", and the calculated total correction "amount" is also calculated as the total correction "time".

When one injector is replaced with a new injector, the needle component-by-component wear amount, the spring component-by-component wear amount, the nozzle component-by-component wear amount, and the injection hole component-by-component wear amount for the injector having been replaced should be reset. Since a connector for connecting a tool (such as a vehicle diagnostic computer) for communicating with a control unit (control device) mounted on a vehicle is prepared in a vehicle in recent years, for example, the tool may be connected to the connector and a command for resetting the component-by-component wear amount of each component corresponding to the replaced injector may be issued.

Effects of the Embodiment

According to the method of controlling the fuel injection amount of the internal combustion engine which has been described in the present embodiment, the injector component which is a plurality of members or a part of such plurality of members forming the injector and affects the accuracy of the fuel injection amount injected from the injector, is selected in advance. Then, the wear amounts for each injector, and for each injector component caused by various factors are appropriately determined, the deterioration according to the use of the injector may be estimated more accurately. Therefore, the deviation of the actual fuel injection amount from the injector relative to the commanded fuel injection amount to the injector may be suppressed.

The method of controlling the fuel injection amount of the internal combustion engine of the present invention is not limited to the process and the operation described in the present embodiment, and various changes, additions, omissions are allowed without changing the scope of the present invention.

Figure 2:
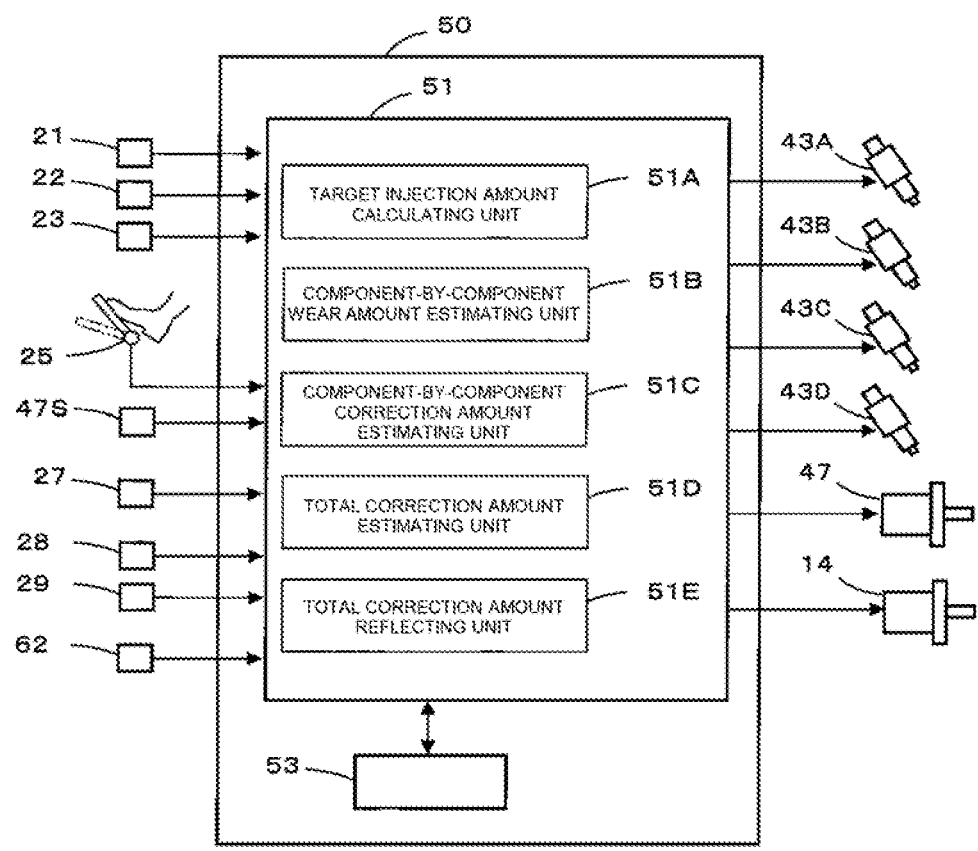
FIG. 2 is a diagram illustrating an example of the input and output of a control device of the internal combustion engine and the configuration of the control device.

Further, the control system to which the method of controlling the fuel injection amount of the internal combustion engine of the present invention is applied is not limited to the example shown in FIG. 1, but it is applicable to various internal combustion engines. For example, it is not limited to diesel engines, but may be applied to gasoline engines. It is not limited to industrial vehicles, but may be applied to general vehicles.

In the description of the present embodiment, an example of calculating (estimating) the component-by-component wear amount such as the needle component-by-component wear amount based on the fuel injection amount, the fuel pressure, the fuel temperature has been described, but it may be calculated (estimated) based on at least one of the fuel injection amount, the number of fuel injections, the fuel pressure, the fuel temperature.

In the description of the present embodiment, an example of calculating the component-by-component wear amount such as the needle component-by-component wear amount by accumulating the wear amount per injection has been described, but the wear amount at this time multiplied by the number of fuel injections, a coefficient corresponding to the current wear amount multiplied by the accumulated drive distance, and the like, or the current wear amount may be regarded as the component-by-component wear amount.

In the description of the present embodiment, an example in which the target injection "amount" is obtained as the target injection "time", the component-by-component correction "amount" is obtained as the component-by-component correction "time", the total correction "amount" is the total correction "time", and the corrected target injection "amount" is the corrected target injection "time" is explained. However, the target injection "amount" may be defined as the target injection "time" and the component-by-component correction "amount" as the component-by-component correction "coefficient", the total correction "amount" as the total correction "coefficient", and the corrected target injection "amount" as the corrected target injection "time", and the corrected target injection "time"=target injection "time" the total correction "coefficient".

In the description of the present embodiment, an example in which the needle, the return spring, the nozzle, and the injection hole are selected as the injection components has been described, but the injector component may be at least one of the needle, the return spring, the nozzle, and the injection hole. In addition, the injector components are not limited to the needle, the return spring, the nozzle, and the injection hole, but any suitable members or a part of the member that affects the accuracy of the fuel injection amount from the injector may be selected depending on the configuration of the injector and the like.

REFERENCE SIGNS LIST 10 engine (internal combustion engine)
11 intake pipe
12 exhaust pipe
13 EGR passage
14 EGR valve
15 EGR cooler
21 flow rate detector
22 rotation detector
23 atmospheric pressure detector
25 accelerator pedal depression amount detector
27 vehicle speed detector
28 fuel temperature detector
29 fuel pressure detector
41 common rail
43A, 43B, 43C, 43D injector
431 body
432 suction chamber
433 control chamber
434 needle chamber
435 charging chamber
436 connector
437 high-pressure fuel supply passage
438 return fuel discharge passage
441 electromagnetic coil
442 return spring
443 control valve
444 ball valve
445 orifice
446 needle spring
447 needle
448 nozzle
449 injection hole
45A, 45B, 45C, 45D cylinder
47 electronic throttle device
47S throttle opening detector
50 control device
51 controller
53 memory

The invention claimed is:

1. A method of controlling a fuel injection amount of an internal combustion engine using a control device, the method comprising:
a target injection amount calculation step at which a target injection amount to be injected from an injector is calculated according to an operating condition of the internal combustion engine;
a component-by-component wear amount estimation step at which a component-by-component wear amount of an injector component is estimated, the component-by-component wear amount being a wear amount of the injector component, the injector component being a plurality of members or a part of the member constituting the injector and selected in advance as the injector component affects an accuracy of the fuel injection amount from the injector;
a component-by-component correction amount calculation step at which a component-by-component correction amount for the injector component is calculated based on the component-by-component wear amount of the injector component, the component-by-component correction amount for the injector component being a correction amount for the injector component;
a total correction amount calculation step at which a total correction amount is calculated based on the component-by-component correction amount of the injector component, the total correction amount is a total correction amount for the entire injector; and
a total correction amount reflection step at which the injector injects a corrected target injection amount, the corrected target injection amount being the target injection amount corrected by the total correction amount.

2. The method of controlling the fuel injection amount of the internal combustion engine according to claim 1, wherein
the injector component is at least one of a single member, a grouped member consisting of a plurality of associated single members, a part of the single member, or a part of the grouped member.

3. The method of controlling the fuel injection amount of the internal combustion engine according to claim 1, wherein
the component-by-component wear amount of the injector component is estimated based on at least one of the fuel injection amount from the injector, the number of fuel injections from the injector, a fuel pressure that is a pressure of fuel supplied to the injector, and a fuel temperature that is a temperature of fuel supplied to the injector.

4. The method of controlling the fuel injection amount of the internal combustion engine according to claim 3, wherein
the component-by-component wear amount of the injector component is estimated by accumulating the component-by-component wear amount of the injector component per injection that is estimated based on at least one of the fuel injection amount from the injector, the number of fuel injections from the injector, a fuel pressure that is a pressure of fuel supplied to the injector, and a fuel temperature that is a temperature of fuel supplied to the injector.

5. The method of controlling the fuel injection amount of the internal combustion engine according to claim 4, wherein when the injector is replaced,
an accumulated component-by-component wear amount accumulated in connection with the replaced injector is reset.

6. The method of controlling the fuel injection amount of the internal combustion engine according to claim 1, wherein the component-by-component correction amount is calculated based on the component-by-component wear amount for the injector component and a component-by-component correction amount map that is set for the injector component and in which a correction amount corresponding to a predetermined wear amount is set relative to the fuel injection amount and the fuel pressure.

7. The method of controlling the fuel injection amount of the internal combustion engine according to claim 1, wherein the target injection amount is a target injection time,
the component-by-component correction amount is a component-by-component correction time,
the total correction amount is a total correction time that is a total of the component-by-component correction time corresponding to the component-by-component correction amount, and
the corrected target injection amount is a corrected target injection time, the corrected target injection time being a value obtained by adding the total correction time to the target injection time.

8. The method of controlling the fuel injection amount of the internal combustion engine according to claim 1, wherein the injector includes:
a nozzle having an injection hole through which fuel is injected;
a needle opening and closing the injection hole;
a return spring moving the needle to a closing position to close the injection hole; and
an electromagnetic coil moving the needle to an opening position to open the injection hole, and
the injector component is at least one of the injection hole, the nozzle, the needle, and the return spring.

\* \* \* \* \*